United States Patent
Nguyes

(10) Patent No.: US 7,357,544 B2
(45) Date of Patent: Apr. 15, 2008

(54) NIGHT VISION SYSTEM FOR MOTOR VEHICLES

(75) Inventor: Van Du Nguyes, Gams (CH)

(73) Assignee: OC Oerlikon Balzers AG, Balzers (LI)

( * ) Notice: Subject to any disclaimer, the term of this patent is extended or adjusted under 35 U.S.C. 154(b) by 281 days.

(21) Appl. No.: 11/174,835

(22) Filed: Jul. 5, 2005

(65) Prior Publication Data
US 2006/0002124 A1    Jan. 5, 2006

Related U.S. Application Data

(60) Provisional application No. 60/586,664, filed on Jul. 9, 2004.

(30) Foreign Application Priority Data
Jul. 5, 2004    (EP) ................... 04015743

(51) Int. Cl.
F21V 11/00    (2006.01)
(52) U.S. Cl. ............. 362/510; 362/234; 362/293; 362/507
(58) Field of Classification Search ............. 362/234, 362/293, 507, 510
See application file for complete search history.

(56) References Cited

U.S. PATENT DOCUMENTS 4,931,315 A    6/1990  Mellor 5,552,927 A    9/1996  Wheatly
2001/0019482 A1    9/2001  Takashi et al.

FOREIGN PATENT DOCUMENTS

| EP | 0 936 107 A  | 8/1999 |
| EP | 0 936 107 A1 | 8/1999 |
| EP | 1 298 481 A  | 4/2003 |
| FR | 2 800 152 A  | 4/2001 |

OTHER PUBLICATIONS

Gottfried Schroeder, "Technische Optik," Kamprath-Reihe, Grundlagen und Anwendungen, 7th Edition, printd Nov. 5, 2007. Anhang 5, Lichtifarbe, Trichromatische Koordinaten, Begrenzungs-,Schluss-,Brems-,Umrissleuchten, May 10, 2007.
Spindler & Hoyer "Precision Optical" pp. 49-51, May 9, 2007.
Farbortbox entspr. Streitpatent Anspr. 3 im Vergleich zum ECE-Weiss-Bereich, no date.

*Primary Examiner*—Stephen F. Husar
*Assistant Examiner*—Meghan K. Dunwiddie
(74) *Attorney, Agent, or Firm*—Pearne & Gordon LLP

(57) ABSTRACT

An infrared lighting device for motor vehicles, for example a headlight, has a radiation source and a filter, whereby the device emits white and infrared radiation at a certain intensity in a wavelength range between 800 and 1200 nm on one axis, and the filter at a first angle may transmit a first visible part and at a second angle different from the first may transmit a second visible part of the radiation source, and both parts transmitted form white light.

15 Claims, 3 Drawing Sheets

NIGHT VISION SYSTEM FOR MOTOR VEHICLES

This invention concerns night vision auxiliary systems for motor vehicles. Systems are known that comprise an infrared headlight, which beams radiation to the outside in front of the vehicle, as well as an infrared camera and a system for transmitting an image taken by the camera in visible form to the driver. The headlight has a source of white light and a filter, which suppresses the visible part of the radiation from the radiation source and transmits the part that is in the infrared range.

However, in practice, this type of filter often lets through some of the visible radiation, especially the radiation in the red color range. But in a headlight, any such red colored radiation that gets through, no matter how intense, is disturbing, since it can cause another driver to become confused between the front lighting and the back lighting of the vehicle. Improving the filter in terms of suppressing the red light while keeping the useful part of the infrared radiation, i.e., the radiation in the range between 800 nm and 1000 nm, is expensive. The problem is that the range to be suppressed (red) is directly connected to the useful infrared range that gets through. For this, the characteristic transmission curve of the filter would have to have steep edges since the very good suppression necessary in the red range is opposed to the very good transmission necessary in the IR range.

To solve this problem, DE 699 03 076 discloses an infrared lighting device that includes a filter whose transmission ratio is designed in such a way that it emits white and infrared radiation along one axis of the device, whereby the intensity of the white radiation can be completely different from zero, but amounts to less than 2000 Cd.

This is done by having the filter transmit infrared beams (IR beams), ultraviolet beams (UV beams) and visible near-blue and near-red beams and visible primary beams with a yellow-green primary color between them. FIG. 1 shows schematically the transmission ratio T of a filter, as it can be used as a function of the wavelength ë according to one embodiment in DE 699 03 076. The residual visible radiation it transmits is then added to a white color effect.

Such filters can be produced by a multilayer system. Their reflection and characteristic transmission curves are essentially based on interference effects. In the state of the art, the filter is made so it may transmit the visible radiation from a radiation source in such a way that there is a synthesis of the visible transmitted part of the white light (see Claim 3 of DE 699 03 076). Since interference filters exhibit angle-dependent transmission behavior, the filter must be adjusted to the respective lighting geometry of the headlight. For example, FIG. 3a shows a headlight 2 with lighting geometry in which the filter 10 is basically acted on vertically. On the other hand, the lighting geometry of the headlight in FIG. 3b results in an impact geometry in which the vertical impact plays basically no role. But adjusting the filter to a respective new geometry is time-consuming and hence expensive.

The problem to be solved with this invention is therefore to provide a filter whose characteristic transmission curve has great tolerance to variations in lighting geometry.

Another problem to be solved is the design fluctuations involved in producing such interference filters which are difficult to avoid. The basic parameters for the characteristic transmission curve include the optical layer thickness and the indices of refraction of the layers. Slight fluctuations in these parameters during the coating process or, what is much more probable, from one coating to the next, can have an impact on which parts of the visible light will be transmitted. It is difficult to make sure that only a small part of the visible radiation gets through (for example in the range of 0.5%), and small uncertainties in transmission can cause large changes in the color effect.

Another problem to be solved with this invention is therefore to provide an interference filter needed for high-yield lighting devices that can be produced without requiring cost-intensive measures to reduce production fluctuations.

THE SOLUTION ACCORDING TO THE PRESENT INVENTION

Figure 1:
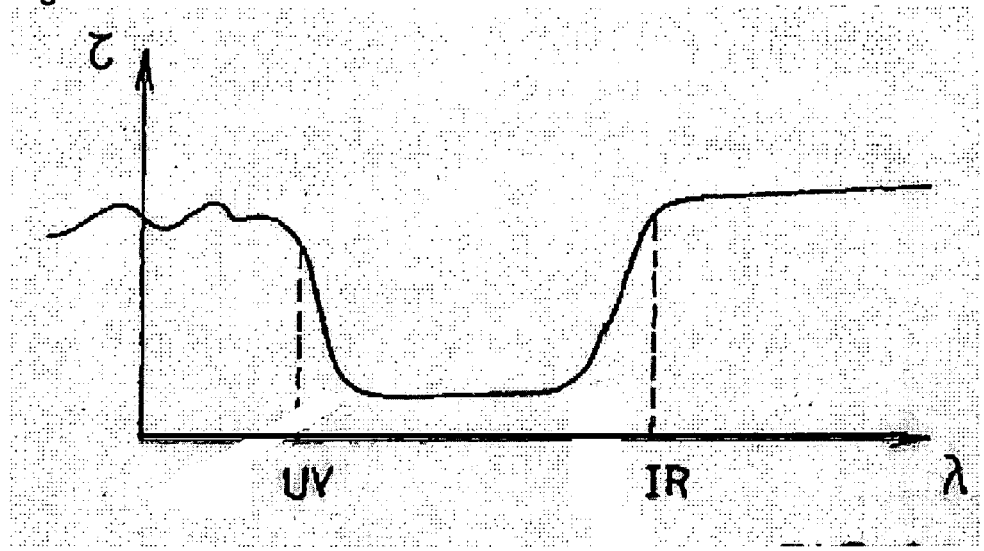
FIG. 1 shows schematically the transmission ratio T of a filter, as it can be used as a function of the wavelength e.
Figure 2:
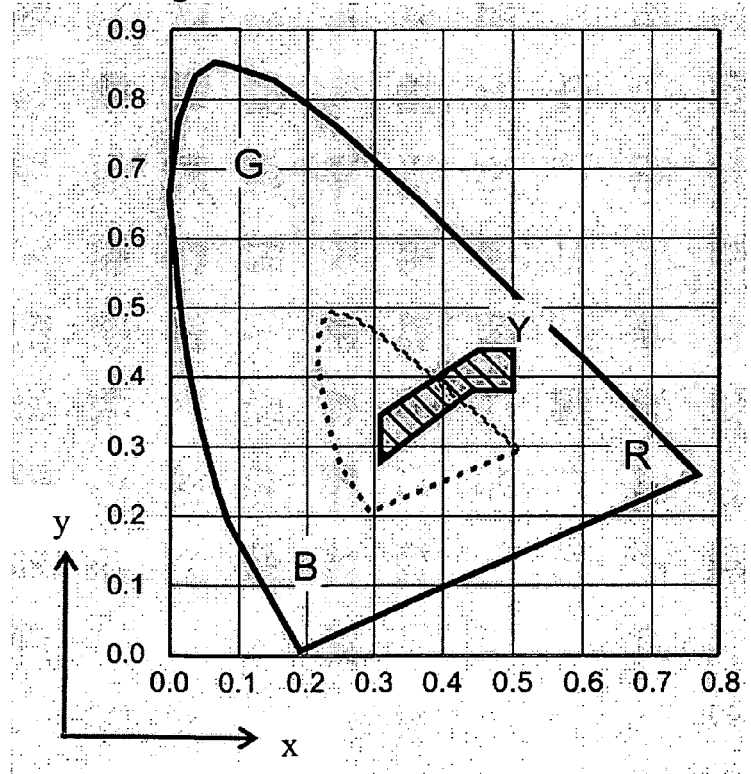
FIG. 2 shows schematically how blue, green, red, and yellow color effects are assigned to a corresponding diagram.
Figure 3A:
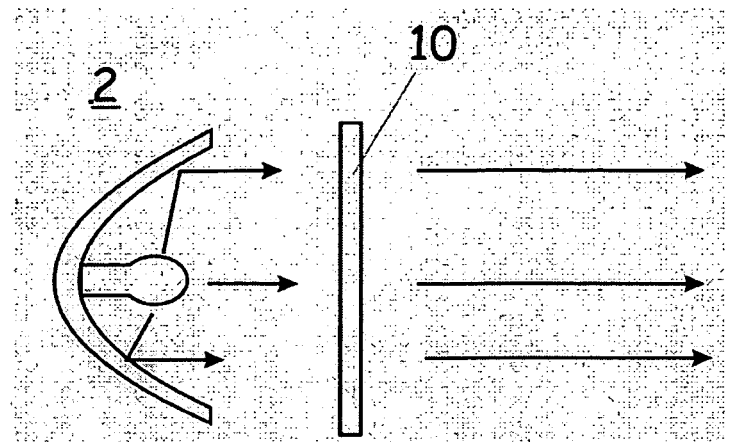
FIG. 3a shows a view of the impact geometry of the night-vision auxiliary headlight with a vertical filter.
Figure 3B:
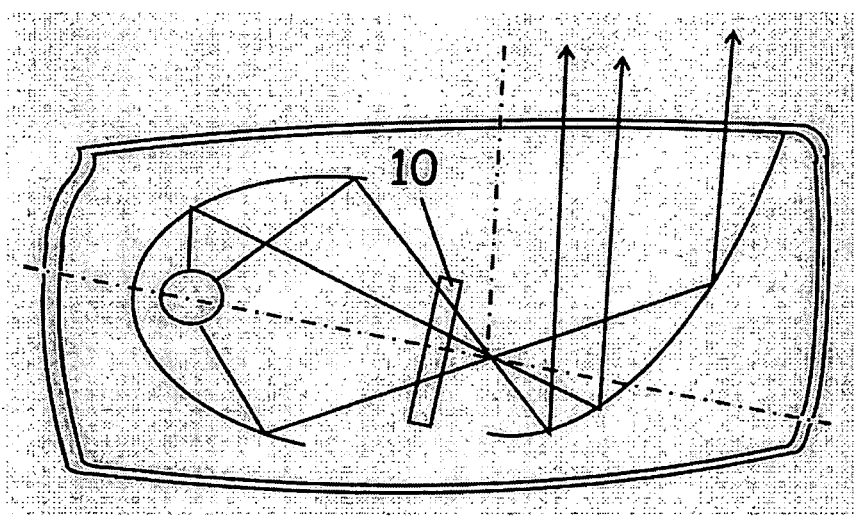
FIG. 3b shows a view of the impact geometry of the night-vision auxiliary headlight with a slanted filter.

As a person skilled in the art knows, color effect is determined by basically 3 factors: a) the characteristic radiating curve of the light source (typical light sources reach their maximum in the green or yellow-green spectral range), b) a physiological factor, which is connected with the wavelength-dependent light sensitivity of the human vision system, whereby light sensitivity is highest in yellow and c) the characteristic transmission curve of the optical system used. Technically, the color effect can be specified by means of so-called color coordinates. FIG. 2 shows schematically how blue (B), green (G), red (R) and yellow (Y) color effects are assigned to a corresponding diagram. FIG. 2 also shows the range, surrounded by a broken line, in which a white color effect prevails.

The cross-hatched area in FIG. 2 gives the legal range for this type of system according to the so-called ECE Standard, which must be met here. This permitted range is shown again magnified in FIG. 4.

The radiation coming from a lighting device must be within this ECE range to match legal requirements. The problem now is to do this for different impact geometries at the same time. As a rule, the typical radiation sources beam in the directions in which they actually radiate, with basically the same characteristic spectral curve. To achieve the desired tolerance in terms of impact geometry, the filter according to the present invention has the property, for a wide range of angles of incidence, of transmitting part of the visible radiation and doing it so that white light is transmitted for basically each of the angles of incidence in the range itself.

This can be brought about by having the radiation transmitted go to the same color coordinates after it comes out of the filter for basically each angle in the range. Such a restrictive condition is not even necessary, however. As the inventor found, one need only make sure that for the range of angles of incidence, the color coordinates are within the legal range. As the inventor also found, it is very advantageous to allow a variation along the blue-yellow axis (FIG.

4 along axis A-A'). When interference filters are produced, during both the design phase and the production phase, special care must be taken that the characteristic transmission curve of the filter is especially stable in the green range. This is both in terms of production tolerances and in terms of angle dependence. This makes fewer demands on stability in the blue and yellow-red ranges. As a result, there are variations in the color coordinates in terms of the angle of incidence and/or the production tolerances. These variations basically come into play, however, along axis A-A' in FIG. 4. This makes it easier and better to comply with the legal requirements than was possible in the state of the art in the past.

An example will now be used to describe in detail the production of the filter in the invention for a range of angles from 0° to 40°, which produces color coordinates that are all within the ECE white range.

Figure 5:
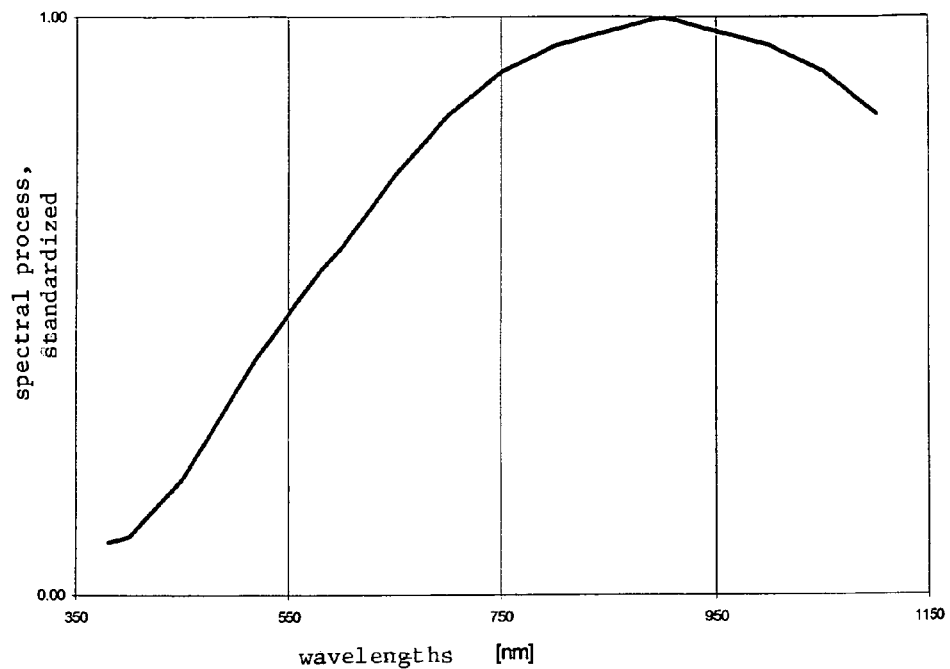
FIG. 5 shows a corresponding spectral range of the filter in the night-vision auxiliary system.
Figure 6A:
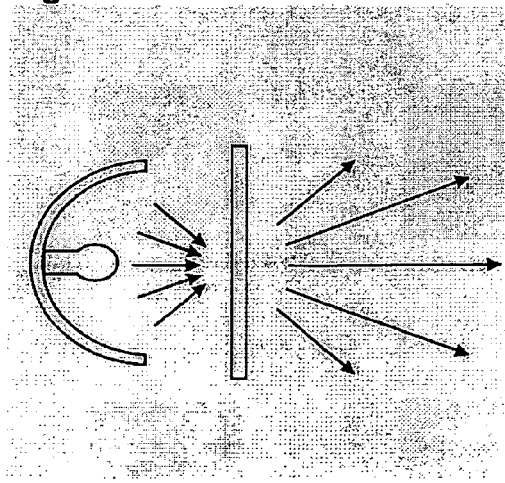
FIG. 6a shows a schematic layout of a night-vision auxiliary headlight.

The filter should be used in a night-vision auxiliary system outfitted with an Osram H11 type (12 V, 55 W, 64211 SUP) halogen headlight lamp. The corresponding spectral range is shown in FIG. 5. The schematic layout of such a headlight is shown in FIG. 6a.

A Corning Glass substrate is used as the substrate material for the filter.

In the example, the coating materials used are niobium oxide as the high-refractive and SiO2 as the low-refractive material for the filter. Possible alternative coating materials would be, for example, titanium oxide/silicon oxide or tantalum oxide/silicon oxide.

To find the thickness needed for the multilayer system, a commercial thin-layer computer program was used (Opti-Layer for Windows by Messrs. A. Tikhonravov and M. Trubetskov).

Figure 4:
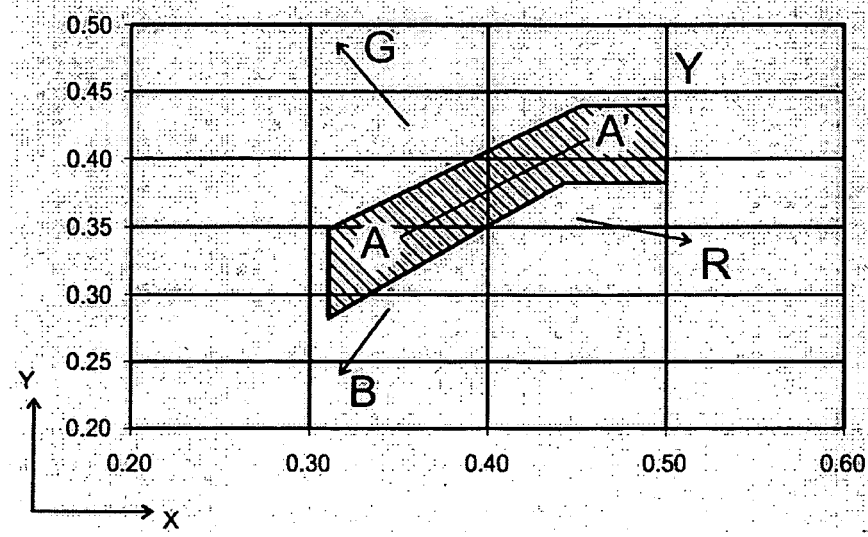
FIG. 4 shows a magnified view of the range in FIG. 2.

By means of a so-called RayTrace Program (ASAP, commercial software), i.e., with software that allows optical paths of beams in complex optical systems to be simulated, the relevant angles of incidence are found. For the example to be described here, the calculation with ASAP shows that the "center of gravity" angle of incidence on the filter is 20°. However, to be largely independent of the precise system layout, the design is also optimized for 0 to 40°, so that the variations run along the "ECE white-range axis" (FIG. 4 along axis A-A').

For this, the design is optimized in steps for one angle after the other. First, a design is found that transmits for 20° angles of incidence in the visible range in the center less than 0.5%. The design should also have a steep edge, whose T=50% point in the example is at 780 nm and that transmits more than 75% for the infrared range (wavelengths 800-1000 nm). In addition, in order to protect the human eye while the headlight is in use, the design is made so that as of approx. 1040 nm on a width of at least 25 nm in the near infrared range, less than 60% are transmitted.

Figure 6B:
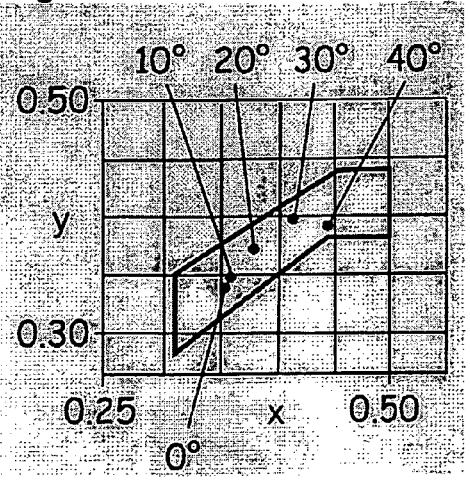
FIG. 6b shows the results of optimization in an angle shift of the filter.

After that, for the 20° angle of incidence the color coordinates need to be optimized in such a way that it is as central as possible in the range of the ECE standard (hence as close as possible to and preferably precisely the coordinates: x=0.375 and y=0.375). However, the special characteristics of the filter need to remain the same (low transmission in the visible, high transmission in teh infrared) during the optimization. Then, the color coordinates are optimized for the angles of incidence 0°, 30° and 40°, so that they fall within the range of the ECE standard. However, for these angles of incidence, the color coordinates produced are not necessarily the same as for the 20° angle of incidence. All that is required is that the angle shift run as much as possible within the ECE white range along the axis shown in FIG. 4 by references A-A'. This is very easy to do if care is taken that the spectra of the different angles for the green range (480-580 nm) have the smallest possible change. The result of such optimization is shown in FIG. 6b for angles of incidence of 0°, 10°, 20, 30° and 40°. The A-A' axis can be defined by means of the straight line equation y=0.695*x+ 0.1. FIG. 6b shows that as the angle of incidence rises, the x coordinate rises monotonic. Preferably the y coordinate should, with an x coordinate that lies in the interval 0.31≦x≦0.45, deviate by a maximum of 0.025 from the straight line defined. For smaller x, the color site is no longer in the ECE range, for larger x, a rather horizontal course is desirable, since here the ECE range has the corresponding course.

Change is limited in the green range by having this range heavily weighted in the optimization. This is necessary not only to guarantee that the filter design for the angles of incidence from 0° to 40° run along the ECE white range, but also to keep the change in light intensity small, since the green range has the greatest impact on this.

Table 1 shows the breakdown of the optical layer thickness design and the refractive index used.

The refractive index of the materials used is 2.34 for niobium oxide and 1.47 for silicon oxide.

Sputter technology was used in the example to produce the filter (more specifically: reactive DC magnetron sputtering). In situ, during the process, the optical spectra are registered continuously (monitoring), and the sputter process is corrected if deviations from the desired spectrum calculated are measured. This ensures that the filters made actually have the required optical characteristic curves, especially in the green range. In other words: so that the color coordinates are within ECE white, production monitoring of the product is weighted highest especially in the wavelength range from 480-580 nm.

Other coating techniques can also be used as alternatives. Among them are in general PVD and CVD processes. As the PVD processes, for example, thermal evaporation can be used. Preferably thermal evaporation is supported by ion bombardment (ion assisted deposition, IAD).

If such a filter is built into the optical path of a light beam, an infrared lighting device for motor vehicles, for example a headlight, can be made with at least one source of radiation and a filter, whereby the device may emit on one axis of the device a white and infrared radiation in a wavelength range that is between 800 and 1200 nm, whereby the infrared radiation has an intensity of more than 25 W/sr, and the white radiation has an intensity not equal to zero of less than 2000 Cd. The filter may transmit a first visible part of a first partial beam from the radiation source at a first angle and a second visible part of a second partial beam from the radiation source at a second angle different from the first. The first angle is basically different from the second angle. In this context "basically" means at least 0.5°. It is characteristic that the first visible part transmitted is white light, and the second visible part transmitted is white light.

| Layer (counted from substrate) | Optical Layer Thickness [nm] | Material |
| --- | --- | --- |
| 1 | 108 | SiO2 |
| 2 | 73 | Nb2O5 |
| 3 | 127 | SiO2 |
| 4 | 144 | Nb2O5 |
| 5 | 133 | SiO2 |
| 6 | 100 | Nb2O5 |

-continued

| Layer (counted from substrate) | Optical Layer Thickness [nm] | Material |
| --- | --- | --- |
| 7 | 109 | SiO2 |
| 8 | 94 | Nb2O5 |
| 9 | 97 | SiO2 |
| 10 | 101 | Nb2O5 |
| 11 | 111 | SiO2 |
| 12 | 90 | Nb2O5 |
| 13 | 110 | SiO2 |
| 14 | 110 | Nb2O5 |
| 15 | 104 | SiO2 |
| 16 | 83 | Nb2O5 |
| 17 | 120 | SiO2 |
| 18 | 132 | Nb2O5 |
| 19 | 119 | SiO2 |
| 20 | 142 | Nb2O5 |
| 21 | 147 | SiO2 |
| 22 | 122 | Nb2O5 |
| 23 | 120 | SiO2 |
| 24 | 117 | Nb2O5 |
| 25 | 171 | SiO2 |
| 26 | 127 | Nb2O5 |
| 27 | 134 | SiO2 |
| 28 | 149 | Nb2O5 |
| 29 | 158 | SiO2 |
| 30 | 126 | Nb2O5 |
| 31 | 118 | SiO2 |
| 32 | 142 | Nb2O5 |
| 33 | 154 | SiO2 |
| 34 | 152 | Nb2O5 |
| 35 | 144 | SiO2 |
| 36 | 173 | Nb2O5 |
| 37 | 154 | SiO2 |
| 38 | 204 | Nb2O5 |
| 39 | 156 | Nb2O5 |
| 40 | 173 | SiO2 |
| 41 | 156 | Nb2O5 |
| 42 | 148 | SiO2 |
| 43 | 243 | Nb2O5 |
| 44 | 168 | SiO2 |
| 45 | 136 | Nb2O5 |
| 46 | 193 | SiO2 |
| 47 | 139 | Nb2O5 |
| 48 | 213 | SiO2 |
| 49 | 146 | Nb2O5 |
| 50 | 207 | SiO2 |
| 51 | 145 | Nb2O5 |
| 52 | 98 | SiO2 |

What is claimed is:

1. An infrared lighting device for motor vehicles with at least one radiation source that emits white light and a filter, whereby the device may emit white and infrared radiation on one axis in a wavelength range between 800 and 1200 nm, whereby the infrared radiation has an intensity of more than 25 W/sr and the white radiation an intensity less than 2000 Cd, however not equal to zero, and the filter at a first angle may transmit a first visible part of white light from a first partial beam from the radiation source, and the filter at a second angle different from the first may transmit a second visible part of white light from a second partial beam from the radiation source, characterized by the fact that the second angle is different from the first and the first visible part transmitted is white light and the second visible part transmitted is white light.

2. The infrared lighting device in claim 1, characterized by the fact that the larger of the two angles leads to an x coordinate of the color site of the corresponding visible part transmitted that is larger than the x coordinate of the color site of the visible part transmitted at the smaller angle.

3. An infrared lighting device for motor vehicles with at least one radiation source that emits white light and a filter, whereby the device on one axis may emit white and infrared radiation in a wavelength range between 800 and 1200 nm, whereby the infrared radiation has an intensity of more than 25 W/sr, and the white radiation has an intensity not equal to zero of less than 2000 Cd, characterized by the fact that for any pair of angles within the range from 0° to 40°, with the first angle and a second angle defined, the filter at the first angle may transmit a first visible part of a first partial beam from the radiation source, and the filter at the second angle, different from the first, may transmit a second visible part of a second partial beam from the radiation source, wherein the first visible part transmitted forms white light, and the second visible part transmitted forms white light.

4. The infrared lighting device in one of claims 2 or 3, characterized by the fact that the respective y coordinates of the color site of the visible part transmitted corresponding to the angles deviates no more than 0.025 from that of the straight line defined by the equation $y=0.695*x+0.1$, for x coordinates in the interval $0.31 \leq x \leq 0.45$.

5. A lighting device for a headlight provided to a motor vehicle comprising:
   a radiation source that emits a first partial beam and a second partial beam;
   a filter positioned adjacent to the radiation source to filter the first partial beam forming a first angle of incidence relative to the filter and the second partial beam forming a second angle of incidence relative to the filter, wherein
   the first and second angles of incidence are different, and the filter transmits a first visible portion of the first partial beam and a second visible portion of the second partial beam, the transmitted portions including a color effect corresponding to an x color coordinate of less than or equal to about 0.5 on a spectrum of colors visible to humans, and further wherein
   the lighting device emits at least white and infrared radiation along an axis in a wavelength range between 800 and 1200 nm, wherein the infrared radiation has an intensity of more than 25 W/sr and the white radiation an intensity of less than 2000 Cd, but not equal to zero.

6. The infrared lighting device according to claim 5, wherein both the first and second visible parts transmitted lead to a color site on a visible color spectrum having a y coordinate that is less than or equal to about 0.275 on the visible color spectrum.

7. The lighting device according to claim 5, wherein a larger of the first and second angles of incidence results in a transmitted portion that has a color effect characterized by an x color coordinate that is larger than an x color coordinate of the transmitted portion of the first and second beam forming a smaller angle of incidence relative to the filter.

8. The lighting device according to claim 5, wherein the angle of incidence of at least one of the first and second beams is about 20°, and the x color coordinate of the transmitted portion is about 0.375.

9. The lighting device according to claim 8, wherein the transmitted portion includes a y color coordinate of about 0.375.

10. The lighting device according to claim 5, wherein respective y color coordinates of the color effect exhibited by the visible portions transmitted deviate no more than 0.025 from a straight line defined by the equation $y=0.695*x+0.1$, wherein x represents x color coordinates in an interval of $0.31 \leq x \leq 0.45$.

11. An infrared lighting device for motor vehicles with at least one radiation source and a filter, whereby the device may emit white and infrared radiation on one axis in a wavelength range between 800 and 1200 nm, whereby the infrared radiation has an intensity of more than 25 W/sr and the white radiation an intensity less than 2000 Cd, however not equal to zero, and the filter at a first angle may transmit a first visible part of a first partial beam from the radiation source, and the filter at a second angle different from the first may transmit a second visible part of a second partial beam from the radiation source, wherein the second angle is different from the first and the first visible part transmitted is white light and the second visible part transmitted is white light, and the larger of the two angles leads to an x coordinate of the color site of the corresponding visible part transmitted that is larger than the x coordinate of the color site of the visible part transmitted at the smaller angle.

12. The infrared lighting device according to claim 11, wherein both the x color coordinate corresponding to the first visible part and the x color coordinate corresponding to the second visible part are less than or equal to about 0.5.

13. The infrared lighting device according to claim 12, wherein both a y color coordinate corresponding to the first visible part and a y color coordinate corresponding to the second visible part are greater than or equal to about 0.375.

14. The infrared lighting device according to claim 11, wherein respective y color coordinates corresponding to the first and second visible parts transmitted by the filter deviate no more than 0.025 from a straight line defined by the equation $y=0.695*x+0.1$, wherein x represents the x color coordinates in an interval of $0.31 \leq x \leq 0.45$.

15. An infrared lighting device for motor vehicles with at least one radiation source and a filter, whereby the device on one axis may emit white and infrared radiation in a wavelength range between 800 and 1200 nm, whereby the infrared radiation has an intensity of more than 25 W/sr, and the white radiation has an intensity not equal to zero of less than 2000 Cd, characterized by the fact that for any pair of angles within the range from 0° to 40°, with the first angle and a second angle defined, the filter at the first angle may transmit a first visible part of a first partial beam from the radiation source, and the filter at the second angle, different from the first, may transmit a second visible part of a second partial beam from the radiation source, wherein the first visible part transmitted forms white light, the second visible part transmitted forms white light, and the respective y coordinates of the color site of the visible part transmitted corresponding to the angles deviates no more than 0.025 from that of the straight line defined by the equation $y=0.695*x+0.1$, for x coordinates in the interval $0.31 \leq x \leq 0.45$.

* * * * *